March 28, 1950 F. M. STEPHENS 2,501,794
SILENCER WITH ELONGATED PIPE
CONNECTING PLURAL CHAMBERS
Filed Jan. 26, 1946 2 Sheets-Sheet 1
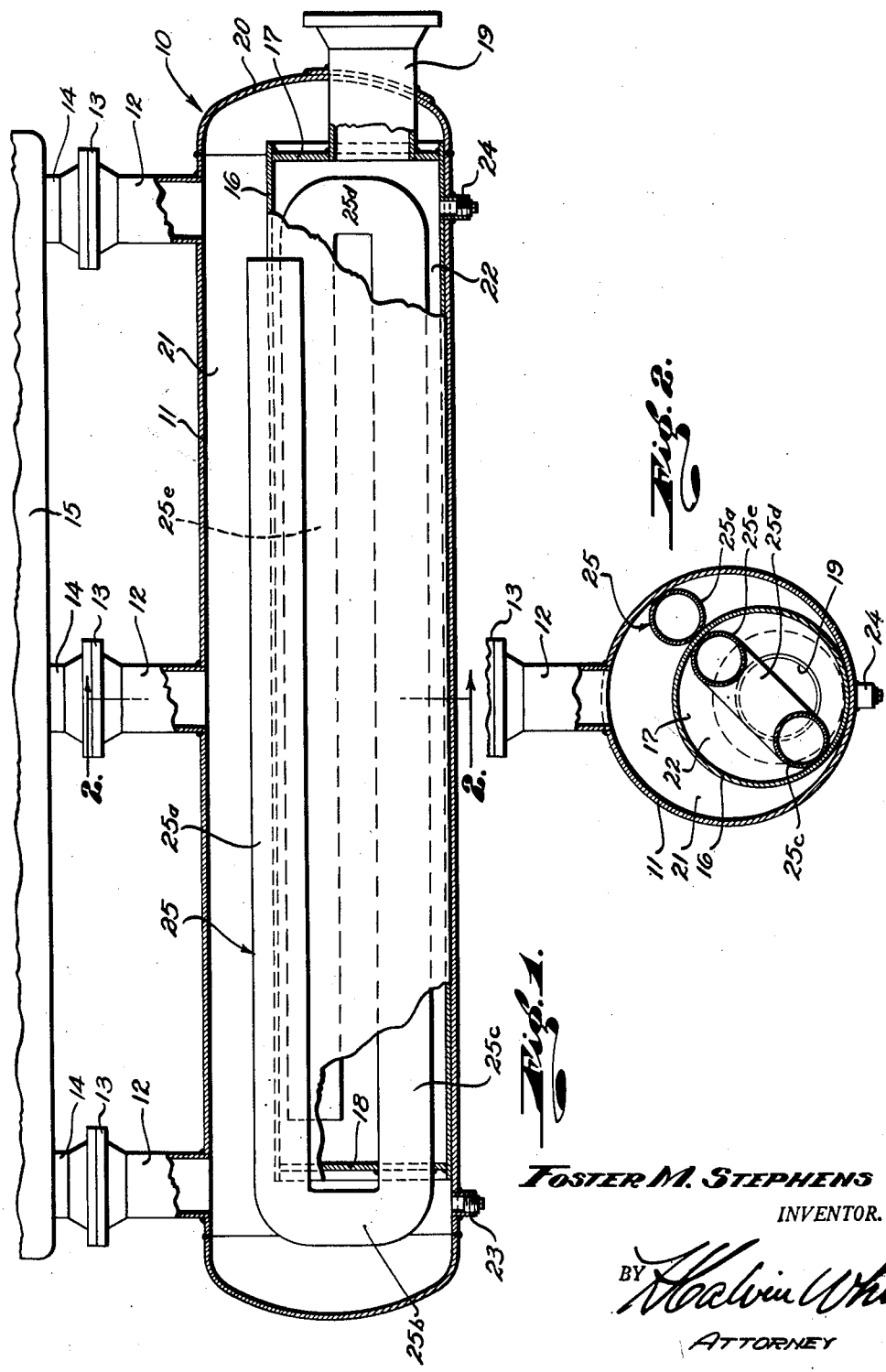
Foster M. Stephens
INVENTOR.
BY
ATTORNEY

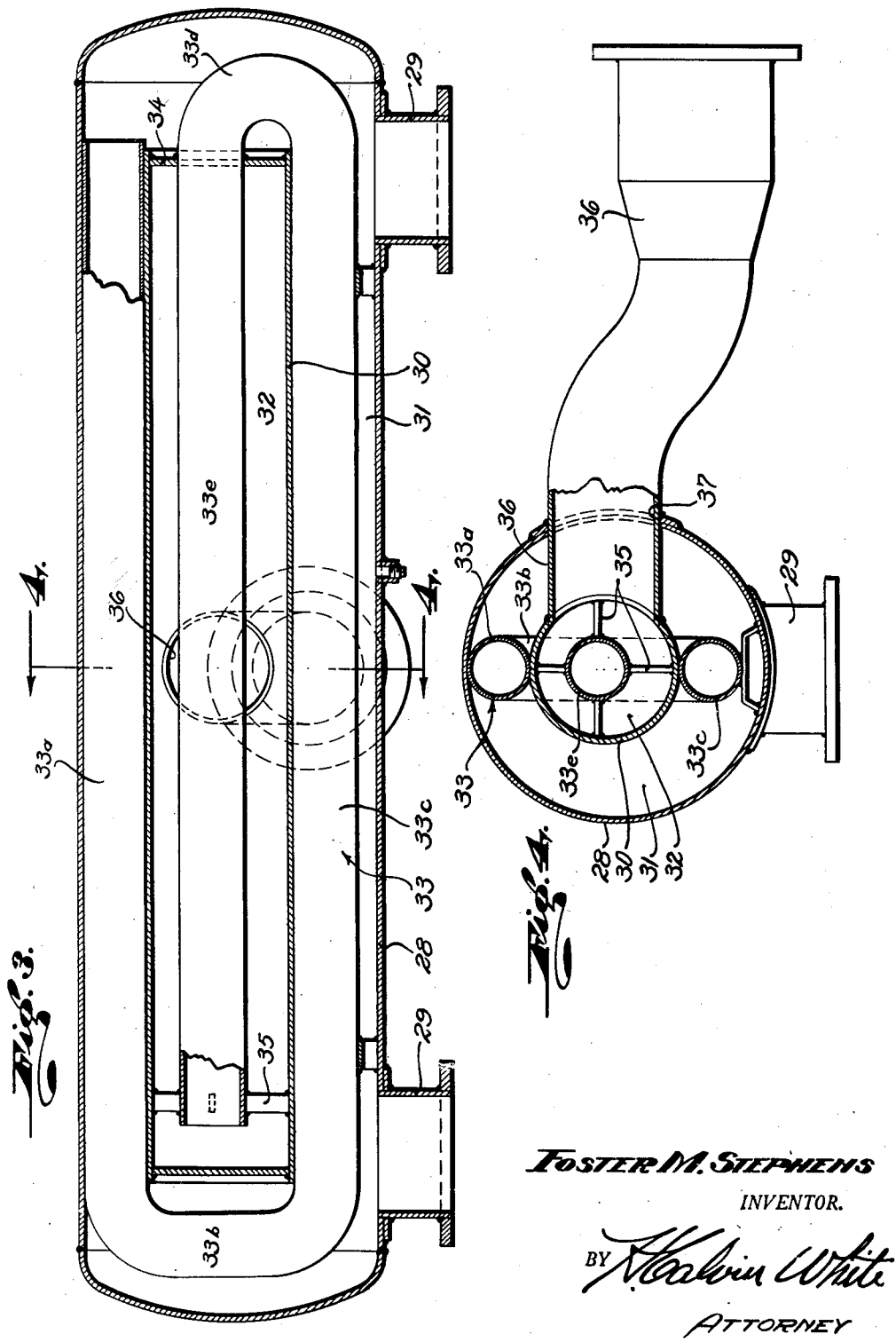

Patented Mar. 28, 1950

2,501,794

UNITED STATES PATENT OFFICE 2,501,794

SILENCER WITH ELONGATED PIPE CONNECTING PLURAL CHAMBERS

Foster M. Stephens, Los Angeles, Calif., assignor to The Fluor Corporation, Ltd., Los Angeles, Calif., a corporation of California Application January 26, 1946, Serial No. 643,510

8 Claims. (Cl. 181—40)

1

This invention has to do with apparatus for dampening pulsations in gas streams generally, and particularly in situations where a plurality of pulsating gas streams are merged into a common stream from which the cumulative pulsations are to be removed. In certain of its aspects the invention contemplates the adaptation to the stated situations, of the general type of pulsation eliminators disclosed in my copending applications Serial Number 517,857 on Pulsation elimination in gas lines, now Patent No. 2,405,100, issued July 30, 1946, and Serial Number 546,657 on Gas pulsation dampening apparatus now Patent Number 2,437,446.

As illustrative, the invention will be described as applied to the removal of pulsations from gas streams at either the suction or discharge sides of compressors (e. g. air or natural gas) where the cumulative pulsations are created by individual sources operating in definite timed relation, as for example a number of compression cylinders powered from the same crank shaft. It will be understood that the apparatus may be installed for elimination of pulsations at the intake side of the compressor to regularize the pressure and flow of the gas feed to the cylinders, or at the discharge side of the compressor for substantial elimination of all appreciable pulsations at or above a selected or the fundamental pulsation frequency, as hereinafter explained. And of course, when necessary, installations of the apparatus may be made at both the intake and discharge sides of the compressor.

One of my major objects is to provide a novel and compact form of pulsation eliminator adapted to be contained within a single shell and having plural inlet gas connections so that the apparatus may serve both as a manifold and pulsation eliminator. As will appear, an outer shell may be adapted to contain two chambers, one formed preferably by an inner shell and the second chamber by the space between the shells, these chambers being in the nature of acoustical capacitances, in combination with at least one elongated connecting passage functioning as an acoustical inductance. The latter passage conveniently is formed by an open end pipe, the length of which, where the pulsation frequencies are relatively low as in the typical instance herein considered, is or may be greater than the outer shell length, so that provision may be made for accommodating reverse extents of the induction pipe within both chambers.

The various features of the invention, and the structure and predeterminable characteristics of units required for pulsation elimination under prescribed conditions, will be understood to better advantage from the following detailed description of the accompanying drawings, in which:

Fig. 1 is a longitudinal section showing one form of the invention connected to a conventionally illustrated compressor, portions of the inner shell being broken away to expose inside parts;

Fig. 2 is a cross section on line 2—2 of Fig. 1;

Fig. 3 is a longitudinal cross sectional view of a variational form of the invention; and Fig. 4 is a cross section on line 4—4 of Fig. 3.

Referring first to Figs. 1 and 2, the pulsation eliminator, generally indicated at 10, is shown to comprise an elongated outer shell 11 having plural, typically three, gas inlets 12 connected at 13 with outlets 14 leading respectively from individual cylinders of the gas compressor conventionally designated at 15, it being understood that the cylinders may contain pistons operating in fixed time relation, as being powered by the same crank shaft. The shell 11 contains a second shell 16 which, as shown in Fig. 2, may be axially offset to the extent of engagement with the bottom of the outer shell. As illustrated, shell 16 has end closures 17 and 18, from the former of which an outlet pipe 19 extends through the outer shell end 20. In the assumed installation, the pulsation eliminator is connected to the discharge side of the compressor, and serves to substantially eliminate from the combined gas streams flowing to the outlet 19, the aggregate of all appreciable pulsations transmitted by the inlet gas stream at and above a selected frequency, or their actual or fundamental frequency. Where the apparatus is to be installed at the inlet side of the compressor, the gas flow through the shell assembly is reversed, the gas being taken in through pipe 19 and passing to the compressor through what then become outlets 12.

Space 21 between the shells and the interior 22 of the inner shell 16, constitute respectively what may be termed first and second acoustical capacitance chambers having predetermined volumes, or corresponding minimum volumes, ascertained in conformance with the conditions of the particular installation, all as will hereinafter appear. Normally plugged nipples 23 and 24 are provided to permit drainage of any liquid that may collect in the chambers.

The chambers 21 and 22 are interconnected by at least one elongated and relatively restricted passage constituting an acoustical inductance creative of high velocity gas flow from the first to the second chambers, and formed by a pipe 25. In accordance with its dimensional requirements, the pipe 25 may have greater length than the containing shell 11, particularly where the pulsation frequency is of a relatively lower order as in the assumed installation. Specifically, the length of the pipe 25 may exceed, as in the illustrated embodiments, twice the length of the chamber-defining shells. To permit accommodation of its entire length within the outer shell, the pipe 25 may extend longitudinally at 25a within chamber 21, then turn upon itself at 25b to extend at 25c within chamber 22, the pipe then having a return bend at 25d to extend at 25e reversely within the inner chamber. Preferably the pipe is imperforate, having uniform diameter and open ends.

The variational form of the invention shown in Figs. 3 and 4, is similar to the described embodiment excepting that it is adapted for connection with two gas inlets and an outlet extending from the inner chamber outwardly through the side of the exterior shell. Here the outer shell 28 has gas inlets 29 for connection with the compressor, and contains an inner closed end shell 30. As before, the space 31 between the shells forms the first or outer acoustical capacitance chamber, and the interior 32 of shell 30 the interior or second chamber. The elongated inductance pipe 33 extends at 33a within chamber 31 above the shell 30, thence downwardly at 33b and reversely at 33c to the return bend 33d, from which the pipe extends through the end 34 of the inner shell longitudinally therein at 33e to the end supports 35. The pulsation-free gas stream leaves chamber 32 through the outlet 36, see Fig. 4, extending at 37 through the outer shell 28.

Considering now the bases for predetermining the dimensions of the acoustical capacitances and inductances, reference typically may be had to the Fig. 1 form of the invention. First it may be observed that the lengths of all ells or return bends used in the chamber interconnecting pipe 25 are added in making the hereinafter explained calculations, as equivalent lengths of straight pipe. The net volume of each chamber (the value of V in the equation below) is determined by subtracting the volume of the pipe 25 in the chamber, from the total volume of the chamber.

Theoretically correct results are obtained by evaluating or predetermining the volumes of the chambers 21 and 22, and the dimensions of the interconnecting passage in pipe 25, with relation to particular conditions for which the installation is to be made. The basis for these determinations is the following equation:

$$\frac{L}{R^2} \times V = \frac{C^2}{78.674 F^2}$$

wherein

L—the length in inches of the passage in pipe 25.
R—radius in inches of that passage.
V—the volume in cubic inches of one of equal volume chambers 21 or 22, or the minimum common volume of two such chambers not necessarily of equal volume.
C—velocity, as defined below, in feet per minute of sound in the gas.
F—fundamental or determined frequency per second of the cumulative pulsations created in the three inlet gas streams by the compressor and at the compressor outlet. At the risk of over sizing the equipment the frequency may be assumed, so long of course as it includes all frequencies, and higher harmonics, to be eliminated.

Relative to determination of the value of C, if the apparatus is installed at the discharge side of the compressor, the theoretically correct value of C is the velocity of the gas in the inlets 12 plus the velocity of sound in the gas. On the other hand, if the apparatus is installed at the suction or intake side of the compressor, the theoretically correct value of C becomes the velocity of sound in the gas in line 19, minus the velocity of the gas flow in that line. Accordingly, the expression "net velocity" is understood to mean the velocity of sound in the gas, plus or minus the velocity of the gas, depending upon whether the apparatus is installed respectively at the discharge or suction sides of the compressor. It may be observed that due to its small value in comparison with the velocity of sound, the velocity of the gas itself may be disregarded without serious sacrifice of satisfactory performance. However, where the formula is to be used in its strict theoretical correctness, the value for the velocity of the gas should be taken into account. Unless specifically qualified, the character C broadly denotes the net velocity or the velocity of sound in the gas with or without taking the gas velocity into consideration.

When a multiple cylinder reciprocating compressor is a source of pulsation, it is possible to determine the cumulative (taking into consideration the three inlet gas streams) fundamental frequency F of the pulsations in accordance with the R. P. M. of the compressor. All harmonics of this frequency naturally will be at a higher frequency than this fundamental. For purposes of calculation and design, it is only necessary to select the cut-off frequency of the apparatus to be just less than the cumulative fundamental compressor frequency, and then the fundamental, as well as its harmonics, will not be transmitted downstream in the gas. Generally speaking, the value for F, i. e. the selected cut-off frequency to be used in the equation, may be taken within the range of about 85% to 100% of the actual cumulative fundamental frequency, which is the total of the frequencies of the pulsations in the three gas streams entering through the inlets 12. Where a compressor is operable at variable frequencies, or speeds, the value for F preferably is selected to be just less than the lowest frequency. Satisfactory results have been obtained at a value for F corresponding to about 90% of the actual fundamental frequency. As previously indicated, lower fundamental frequency may be assumed or selected but at the expense of over sizing the equipment.

Having determined the value for F, it then remains necessary to evaluate the physical dimensions of the chambers 21 and 22, and of the interconnecting pipe 25. The left-hand side of the equation, i. e.

$$\frac{L}{R^2} \times V$$

defines the volume of each chamber and the length and inside radius of the connecting pipe 25. Accordingly, it is only necessary to determine the value for C in order to have an arithmetic value for the entire right-hand side of the equation. The value of the velocity of sound in the gas being compressed is first approximated from existing tables under standard conditions, and is then corrected for pressure and temperature considerations to meet those conditions actually existing at the location in the line where the pulsation is to be arrested.

The value for $$\frac{L}{R^2}$$

is arbitrarily taken to be as large as can be tolerated with regard to pressure loss in the pipe 25. In other words, knowing the gas pressure at chamber 21 and the rate of gas flow to occur through pipe 25, the latter may arbitrarily (based upon experience or actual calculation) be given length and radial dimensions permitting passage of the gas through the line within a suitable or limiting range of pressure drop. Having thus determined the values for C and $$\frac{L}{R^2}$$

the value of each chamber volume, or V, becomes directly determinable. It should be understood that the determined value for V is substantially a minimum value, and that the chamber volume may be increased beyond that value without impairing performance, although in practice it is ordinarily desirable to make the chamber of a size close to its calculated volume in order to economize on materials and avoid unnecessarily large equipment.

Where a single induction passage is used, the dimensions of the pipe 25 will be determined in accordance with the equation hereinabove set forth. Where a multiple arrangement of inductance passage pipes is to be used, as by substituting a plurality of pipes for the single pipe shown, the equation requires variation only to the extent of introducing in the left-hand side of the equation the denominator factor N, which is the number of induction pipes, as follows:

$$\frac{L}{R^2} \times \frac{1}{N} \times V = \frac{C^2}{78.674 F^2}$$

In the equations given above, the value 78.674 represents essentially a conversion factor predicated upon values for L, R, V and C according to the English system, as distinguished from the metric system. If these factors be evaluated in terms of the metric system (expressing L and R as centimeters, V as cubic centimeters, and C as centimeters per second) then the value of pi, or 3.14, is to be used instead of 78.674. It will be understood, and the claims are to be so construed, that the stated equations express the theoretically correct relationship and values, and that in practice it may not be necessary to adhere precisely thereto, so long as the calculations or relative proportions of the apparatus conform fundamentally and substantially to the equations.

The following example will illustrate the practical use and application of the above discussed formula in the design of a pulsation dampener for use at the discharge side of an air compressor.

A. Design conditions:
1. Compressor:
   a. Ingersoll-Rand, Model PRE-1
   b. Two cylinders
   c. Double acting cylinders
   d. Operating speed—180 R. P. M.
   e. Crank angle—90°
2. Gas handled:
   a. Air
   b. Discharge temperature—300° F.
   c. Discharge pressure—47.0 p. s. i. ga.
   d. Volume—3,540 cu. ft./min. at 60° F. and 14.7 p. s. i. abs.
3. Conditions:
   a. Dampener to receive discharge from both cylinders located ten feet apart.
   b. Pressure drop across dampener should not exceed 1.0 p. s. i.
   c. Maximum overall length of dampener should not exceed 13'-0''

B. Design:
1. Determination of value of C: From existing published data, velocity of sound in air at 300° F. and 47.0 p. s. i. ga. is 83,280 feet per minute.
2. Determination of value of F:
   a. Frequency of pulsations per revolution:

$$\frac{360°}{\text{crank angle}} = \frac{360°}{90°} = 4.0$$

b. Frequency of pulsations per second (F):

$$\frac{\text{No. puls. per revolution} \times \text{R. P. M.}}{60 \text{ (seconds)}} =$$

$$\frac{4 \times 180}{60} = 12.0 \text{ P. P. S.}$$

3. Solution for $$\frac{L}{R^2} V$$

$$\frac{L}{R^2} V = \frac{C^2}{78.674 F^2} = \frac{83,280^2}{78.674 \times 12^2} = 612,192$$

4. Determination of value of L and R: Taking into consideration the pressure drop limitation set forth in the design conditions, the value of L may be taken as 360 inches, and R as the radius of 6'' std. steel pipe (these dimensions permitting the allowable pressure drop): $R^2 = (3.0325) = 9.196$ inches 5. Solution for expression $$\frac{L}{R^2}$$

$$\frac{L}{R^2} = \frac{360}{9.196} = 39.147$$

6. Determination of value of V:

$$V = \frac{612,192}{39.147} = 15,638 \text{ cu. in.}$$

Thus the minimum net volume of each capacitance chamber should not be substantially less than 15,638 cu. in. The chamber volumes may be greater than 15,638 cu. in. and may be equal or unequal.

I claim:

1. A manifold assembly connectible with a plurality of compressor cylinders and operable to dampen pulsations in a gas stream fed by pulsating streams of gas displaced by the compressors, comprising an elongated outer shell forming a first chamber, an elongated inner shell contained in and spaced from said outer shell and forming a second chamber, one of said chambers having in its side wall a plurality of longitudinally spaced separate inlets through which said pulsating gas streams are received and the other chamber having a gas outlet, and a pipe of greater length than said outer shell extending in the space between said chambers and passing the gas flowing from said inlets to the outlet, said pipe forming a relatively restricted gas induction passage in pressure transmitting communication with the chambers.

2. A manifold assembly connectible with a plurality of compressor cylinders and operable to dampen pulsations in a gas stream fed by pulsating streams of gas displaced by the compressor, comprising an elongated outer shell forming a first chamber, an elongated inner shell contained in and spaced from said outer shell and forming a second chamber, one of said chambers having in its side wall a plurality of longitudinally spaced separate inlets through which said pulsating gas streams are received and the other chamber having a gas outlet, and a pipe of greater length than either of the individual chambers and contained within said outer shell, said pipe forming a relatively restricted gas induction passage of smaller cross sectional area than said outlet and interconnecting the chambers for series flow of the gas therethrough.

3. A manifold assembly connectible with a plurality of compressor cylinders and operable to dampen pulsations in a gas stream fed by pulsating streams of gas displaced by the compressors, comprising an elongated outer shell forming a first chamber, an elongated inner shell contained in and spaced from said outer shell and forming a second chamber, one of said chambers having in its side wall a plurality of longitudinally spaced separate inlets through which said pulsating gas streams are received and the other chamber having a gas outlet, and a pipe of greater length than either of the individual chambers and of smaller cross sectional area than said outlet extending continuously longitudinally within the space between the shells and reversely within the inner chamber to form a relatively restricted inductance gas passage connecting the chamber for series flow of gas therethrough.

4. A manifold assembly connectible with a plurality of compressor cylinders and operable to dampen pulsations in a gas stream fed by pulsating streams of gas displaced by the compressors, comprising an elongated outer shell forming a first chamber, an elongated inner shell contained in and spaced from said outer shell, and forming a second chamber, said outer chamber having in its side wall a plurality of longitudinally spaced separate inlets through which said pulsating gas streams are received and the inner chamber having a gas outlet, said inner shell being axially offset from the outer shell to bring their side walls substantially into engagement, and a pipe of smaller cross sectional area than said outlet and of greater length than said outer shell extending within the space between the shells and within the inner chamber to form a restricted passage connecting the chambers for series flow of the gas therethrough.

5. A manifold pulsation dampener structure comprising an outer shell, an inner shell within and spaced transversely from the outer shell to form a first chamber, said inner shell forming and containing a second chamber, said structure including a plurality of gas inlets from which gas flows to an outlet in a stream having at spaced locations along its course of flow pressure transmitting communications with both of said chambers, and an elongated pipe restricting the gas stream between said locations, the length of said pipe being greater than the length of said outer shell.

6. A manifold pulsation dampener structure comprising an outer shell, an inner shell within and spaced transversely from the outer shell to form a first chamber, said inner shell forming and containing a second chamber, said structure including a plurality of gas inlets from which gas flows to an outlet in a stream having at spaced locations along its course of flow pressure transmitting communications with both of said chambers, and a substantially imperforate pipe of smaller diameter than said outlet extending continuously within both of said chambers and restricting the gas stream between said locations, the length of said pipe being greater than the length of said outer shell.

7. A manifold assembly connectible with a plurality of compressor cylinders and operable to dampen pulsations in a gas stream fed by separate pulsating streams of gas displaced by the compressors, comprising an elongated outer shell forming a first chamber and an inner shell contained in spaced relation within said outer shell and forming a second chamber, one of said chambers having in its side wall a plurality of longitudinally spaced inlets through which said pulsating gas streams are received and the other chamber having a gas outlet, and a pipe of greater length than said outer shell forming a relatively restricted gas induction passage of smaller cross sectional area than said outlet and passing gas from said inlets to the outlet, said passage being in pressure transmitting communication with said chamber, the minimum volume of each of said chambers and the dimensions of said passage having predetermined values substantially in accordance with the following equation:

$$\frac{L}{R^2} \times V = \frac{C^2}{78.674 F^2}$$

wherein

L—length of said passage in inches.
R—radius of said passage in inches.
V—minimum corresponding or common volume of said chambers in cubic inches.
C—velocity, as herein defined, in feet per minute of sound in the gas.
F—a selected value for the frequency per second of the combined pulsations in said separate streams.

8. Apparatus as claimed in claim 7, in which said pipe extends longitudinally and continuously within both of said chambers and connects the chambers for series flow of the gas therethrough.

FOSTER M. STEPHENS.

REFERENCES CITED

The following references are of record in the file of this patent:

UNITED STATES PATENTS

| Number | Name | Date |
| --- | --- | --- |
| 1,280,386 | Buehner | Oct. 1, 1918 |
| 1,291,271 | Tvedt | Jan. 14, 1919 |
| 1,542,829 | Oldberg | June 23, 1925 |
| 1,553,264 | Reasonover | Sept. 8, 1925 |
| 1,572,116 | Herdle | Feb. 9, 1926 |
| 1,655,230 | Kull | Jan. 3, 1928 |
| 1,739,039 | Powell | Dec. 10, 1929 |
| 2,046,252 | Davis | June 30, 1936 |
| 2,194,928 | Doyle | Mar. 26, 1940 |
| 2,353,036 | Hoyle | July 4, 1944 |